United States Patent
Pan et al.

(10) Patent No.: US 6,785,448 B1
(45) Date of Patent: Aug. 31, 2004

(54) COUPLING METHOD OF COUPLER

(75) Inventors: Chih-Liang Pan, Hsinchu (TW);
Chih-Yu Cheng, Hsinchu (TW);
Winyann Jang, Hsinchu (TW)

(73) Assignee: U-Conn Technology Inc., Hsinchu (TW)

( * ) Notice: Subject to any disclaimer, the term of this patent is extended or adjusted under 35 U.S.C. 154(b) by 0 days.

(21) Appl. No.: 10/762,257

(22) Filed: Jan. 23, 2004

(51) Int. Cl.[7] .............................. G02B 6/26; C03B 3/15
(52) U.S. Cl. ........................ 385/43; 385/42; 385/39; 385/31; 385/140; 385/147; 65/406; 65/408
(58) Field of Search ........................... 385/31, 39, 42, 385/43, 46, 52, 140, 147; 65/406, 408

(56) References Cited

U.S. PATENT DOCUMENTS

| | | | | | |
|---|---|---|---|---|---|
| 4,906,068 A | * | 3/1990 | Olson | ........................ | 385/43 |
| 4,997,248 A | * | 3/1991 | Stowe | ........................ | 385/43 |
| 5,015,058 A | * | 5/1991 | Thorncraft et al. | ........... | 385/28 |
| 5,078,465 A | * | 1/1992 | Dahlgren | ...................... | 385/50 |
| 5,883,992 A | * | 3/1999 | Gonthier | ...................... | 385/43 |
| 6,599,957 B2 | * | 7/2003 | Dawes et al. | ............... | 522/149 |

* cited by examiner

*Primary Examiner*—Brian M. Healy
(74) *Attorney, Agent, or Firm*—Troxell Law Office PLLC

(57) ABSTRACT

A coupling method of a coupler includes the following steps: (1) making a pair of optical fibers with different photosensitivity fused and drawn, (2) irradiating specific portions of the pair of optical fibers by intense ultraviolet light at the same time for making refractive index of the pair of optical fibers markedly different, (3) supervising coupling light energy loss spectrum and gradually adjusting the intense ultraviolet light for decreasing maximum coupling ratio and achieving an optical fiber coupler of optimum flat spectrum, thereby improving fabricating process and reducing deficient products.

6 Claims, 3 Drawing Sheets

COUPLING METHOD OF COUPLER

BACKGROUND OF THE INVENTION

1. Field of the Invention

The present invention relates to a coupling method of an optical fiber coupler, and particularly to a coupling method including (1) making a pair of optical fibers with different photosensitivity fused and drawn, (2) irradiating the pair of optical fibers with intense ultraviolet light (hereafter referred to as UV radiation) at the same time, (3) supervising and gradually adjusting the UV radiation to obtain asymmetric refractive index of the pair of optical fibers for decreasing maximum coupling ratio, thereby achieving an optical fiber coupler with optimum flat spectrum.

2. Related Art

Optical fiber couplers are popularly used in optical fiber transmission systems and optical fiber detection systems. It is well known that an optical fiber coupler is fabricated by keeping cores of a pair of optical fibers close with each other, as shown in U.S. Pat. Nos. 4,763,272, 5,410,626 etc.

The coupling method of keeping cores of a pair of optical fibers close with each other can easily adjust coupling ratio. As disclosed in U.S. Pat. Nos. 4,763,272, 5,410,626, one of the optical fibers is pre-pulled for being tapered, and then it is fused and drawn together with another optical fiber. Geometric asymmetry of the two optical fibers reduces maximum coupling ratio so as to make coupling spectrum flat. However, stepping motors drive the optical fiber to be tapered, hence neither precision of pulling nor flatness of coupling spectrum is controllable. Moreover, the coupling spectrum is determined after fusing and drawing the two optical fibers, so it is not adjustable during coupler fabricating process.

SUMMARY OF THE INVENTION

Accordingly, an object of the present invention is to provide a coupling method of an optical fiber coupler, which includes supervising and gradually adjusting light energy loss spectrum so as to achieve maximum flat coupling spectrum, thereby improving fabricating process and reducing deficient products.

The coupling method includes the steps: (1) making a pair of optical fibers with different photosensitivity fused and drawn, (2) irradiating specific portions of the optical fibers with UV radiation at the same time to make refractive index of the optical fibers markedly different, (3) supervising light energy input loss spectrum and gradually adjusting UV radiation so as to decrease maximum coupling ratio, thereby achieving optimum flat spectrum.

The pair of optical fibers comprises a single-mode optical fiber of poor photosensitivity and a boron-germanium codoped optical fiber of excellent photosensitivity.

DESCRIPTION OF THE PREFERRED EMBODIMENTS

Figure 1:
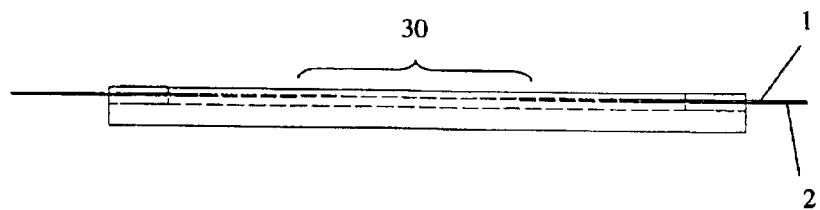
FIG. 1 is a plane view of a pair of optical fibers according to the coupling method of the present invention.
Figure 2:
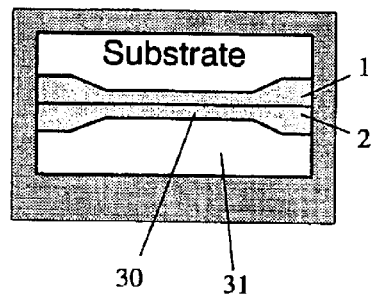
FIG. 2 is an enlarged view of fused and drawn portions of the optical fibers of FIG. 1.
Figure 3:
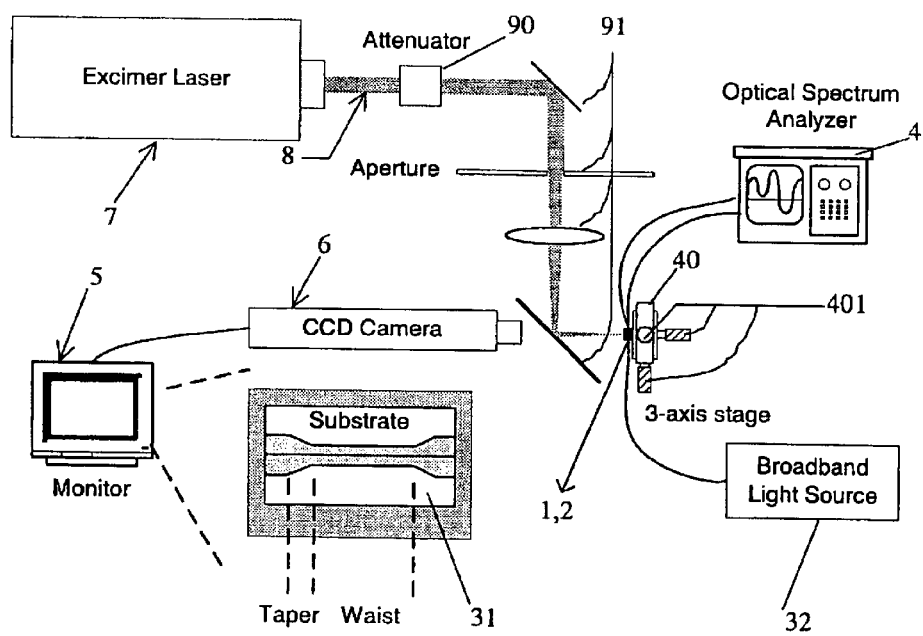
FIG. 3 is a sketch view of the coupling method of the present invention.

The coupling method of an optical fiber coupler comprises the following steps: (1) with reference to FIG. 1, a pair of optical fibers with different photosensitivity are combined together in parallel. Where one of the optical fibers is a boron-germanium codoped optical fiber 1, and the other is a single-mode optical fiber 2. Specific portions of the boron-germanium codoped optical fiber 1 and the single-mode optical fiber 2 are heated and extended to form a fused portion 30 (referring to FIG. 2) and packaged in a substrate 31. Note that the length of the fused portion 30 is determined according to requirements of wavelength spectrum of optical communication. (2) Referring to FIG. 3, the optical fibers 1, 2, the fused portion 30 and the substrate 31 are fixed on a stage 40 for facilitating to adjust the coupling process. An optical spectrum analyzer 4 and a broadband light source 32 connect with the optical fibers 1, 2. Intense ultraviolet light (hereafter referred to as UV radiation) 8 is emitted from an Excimer Laser 7. A fiber attenuator 90 and an optical device 91 are provided behind the UV radiation 8 for adjusting irradiation of UV radiation 8 on the stage 40. An image catching device 6 aims at a focus of UV radiation 8 on the stage 40, and adjusts position of space by three axes 401 of the stage 40 where could see the focus of UV radiation 8 irradiates at the fused portion 30 of the optical fibers 1, 2 from a monitor 5 which communicates with the image catching device 6. And the UV radiation 8 irradiates the fused portion 30 for a period of time.

Figure 4:
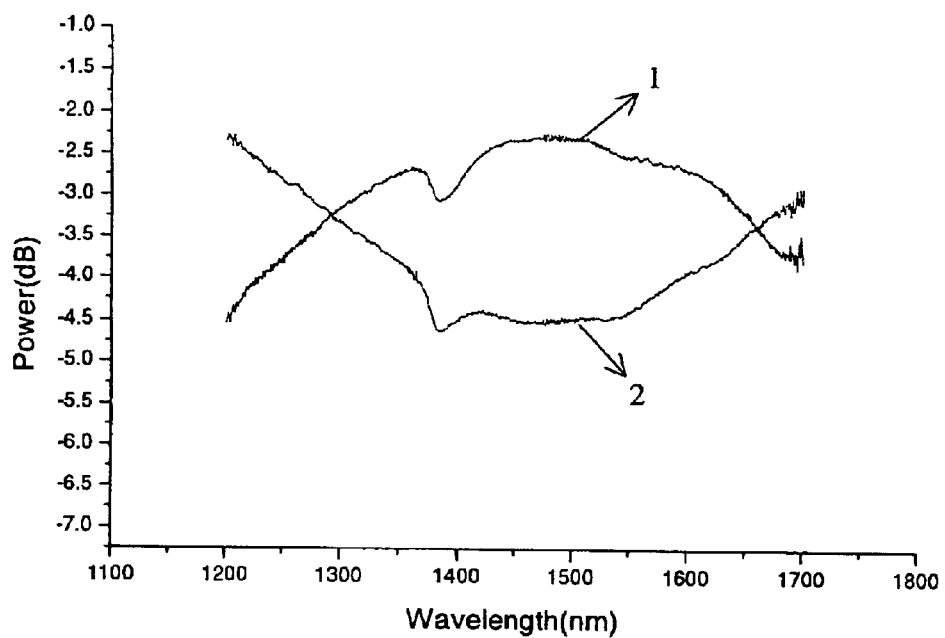
FIGS. 4 and 5 are sketch views of the light energy input loss wavelength spectrum.
Figure 5:
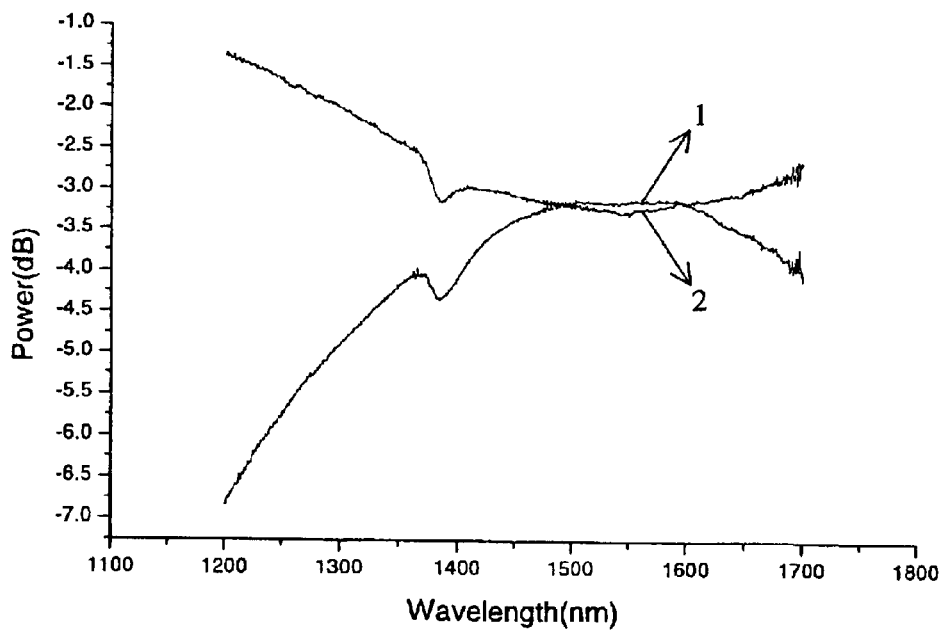
Figure 6:
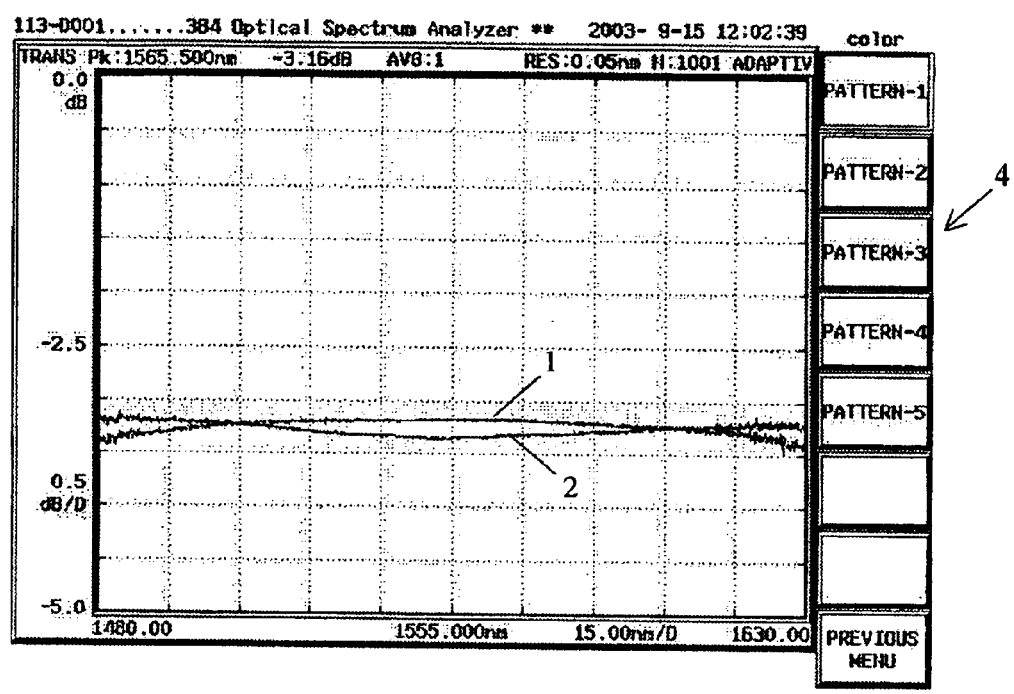
FIG. 6 is a measured view of maximum flat spectrum.

After a period of irradiation, refractive index of the optical fibers 1, 2 become markedly different and are asymmetric so as to decrease maximum coupling ratio. Namely, longer time of irradiation, refractive index of the optical fibers 1, 2 increases, and difference between refractive index of the optical fibers 1, 2 becomes more remarkable. Supervising from the optical spectrum analyzer 4, the peak of coupling light energy input loss spectrum is floating. Referring to FIGS. 4 and 5, after a period of irradiation, the peak of the loss spectrum of the boron-germanium codoped optical fiber 1 floats from (1490 nm, −2.3 dB) to (1550 nm, −3.2 dB), that is, the loss spectrum floats downward and rightward; while the peak of the loss spectrum of the single-mode optical fiber 2 floats from (1490 nm, −4.5 dB) to (1550 nm, −3.2 dB), that is, the loss spectrum floats upward and rightward. In this process, the optical fibers 1, 2 gradually access to maximum flat area. Finally the UV radiation 8 is turn off when the input loss spectrum arrives at maximum flat area. A flat coupler with coupling ratio of 50/50 is obtained for meeting need of optical communication at wavelength 1550 nm. The skilled persons in the art know that the present invention is not limited in 50/50 coupler or in 1550 nm wavelength range. The present invention is also suitable for other type couplers and other wavelength, for example, uneven split ratio couplers or wavelength range from 1260 nm to 1650 nm.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A coupling method of an optical fiber coupler with maximum flat coupling spectrum of a pair of optical fibers, comprising:

(1) Combining the pair of optical fibers with different photosensitivity in parallel, and heating and extending specific portions of the optical fibers to form a fused portion and packaged in a substrate;

(2) Irradiating the pair of optical fibers by intense ultraviolet light (hereafter referred to as UV radiation) at the same time;

(3) adjusting UV radiation and laying the fused portion under focus of the UV radiation for a period of time for making refractive index of the pair of optical fibers markedly different and asymmetric to decrease maximum coupling ratio; and (4) supervising floating state of a peak of light energy loss spectrum of the fused portion by an optical spectrum analyzer, and turning off the UV radiation when the loss spectrum arrives at maximum flat area.

2. The coupling method of the optical fiber coupler as claimed in claim 1, wherein the pair of optical fibers comprises a boron-germanium codoped optical fiber of excellent photosensitivity and a single-mode optical fiber of poor photosensitivity.

3. The coupling method of the optical fiber coupler as claimed in claim 1, further comprising a stage having three axes for adjusting the position of the optical fibers.

4. The coupling method of the optical fiber coupler as claimed in claim 3, further comprising an image catching device aiming at the focus of the UV radiation on the stage with image being shown on a monitor.

5. The coupling method of the optical fiber coupler as claimed in claim 3, wherein a fiber attenuator and an optical device are provided behind the UV radiation for adjusting irradiation of the UV radiation on the stage.

6. The coupling method of the optical fiber coupler as claimed in claim 1, wherein the length of the fused portion is determined according to requirements of wavelength spectrum of optical communication.

* * * * *